ELECTRIC AMPLIFIERS WITH NONLINEAR PIEZOIDS

Filed Nov. 8, 1951 2 Sheets-Sheet 1

INVENTOR.
HANS E. HOLLMANN
BY D. C. Snyder
A R McGrady
ATTORNEY

Dec. 4, 1956 H. E. HOLLMANN 2,773,137

ELECTRIC AMPLIFIERS WITH NONLINEAR PIEZOIDS

Filed Nov. 8, 1951 2 Sheets-Sheet 2

INVENTOR.
HANS E. HOLLMANN
BY D. E. Snyder
A R McCrady
ATTORNEY

United States Patent Office 2,773,137

Patented Dec. 4, 1956

2,773,137

ELECTRIC AMPLIFIERS WITH NONLINEAR PIEZOIDS

Hans E. Hollmann, Oxnard, Calif.

Application November 8, 1951, Serial No. 255,507

3 Claims. (Cl. 179—171)

(Granted under Title 35, U. S. Code (1952), sec. 266)

This invention relates to electric amplifiers, and it has particular relation to amplifiers including piezoid capacitors.

A capacitor having a piezoelectric substance such as Rochelle salt, barium titanate, or barium-strontium titanate as a dielectric is placed in one arm of an alternating current bridge circuit. The input current or voltage to be amplified bring about a change in the dielectric constant of the piezoelectric substance. The extent to which the bridge is unbalanced by the resulting change in capacitance is a funciton of the strength of the input voltage. Feedback improves the operation of the bridge circuit.

One object of the invention is to provide a new type of amplifying device in which the capacitance of a piezoid capacitor is varied by means of an A. C. or D. C. input voltage to develop an output voltage proportional to the input voltage.

It is a further object of the invention to provide a piezoid capacitor amplifier in which feedback is used to improve sensitivity to low input voltages.

Other objects and many of the attendant advantages of this invention will be readily appreciated as the same becomes better understood by reference to the following description.

Figures 1, 2, 3:
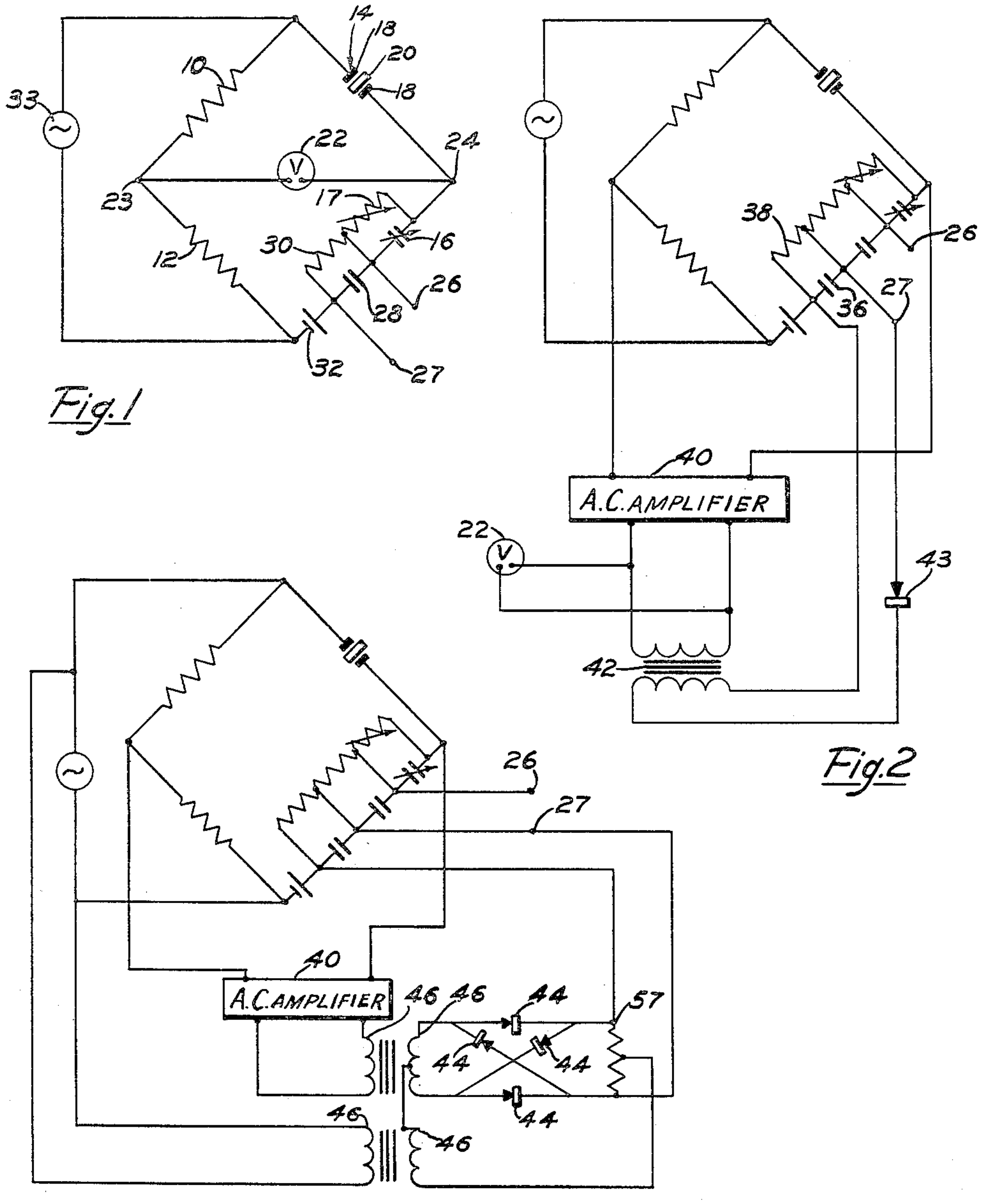
Fig. 1 shows a circuit in which the piezoid capacitor is present in one arm of a bridge.
Fig. 2 illustrates a refinement of the Fig. 1 circuit in that feedback is used to increase the sensitivity of the device.
Fig. 3 represents a further refinement of the circuit shown in Fig. 1 in which feedback is always regenerative even though the polarity of input voltage may change.
Figure 4:
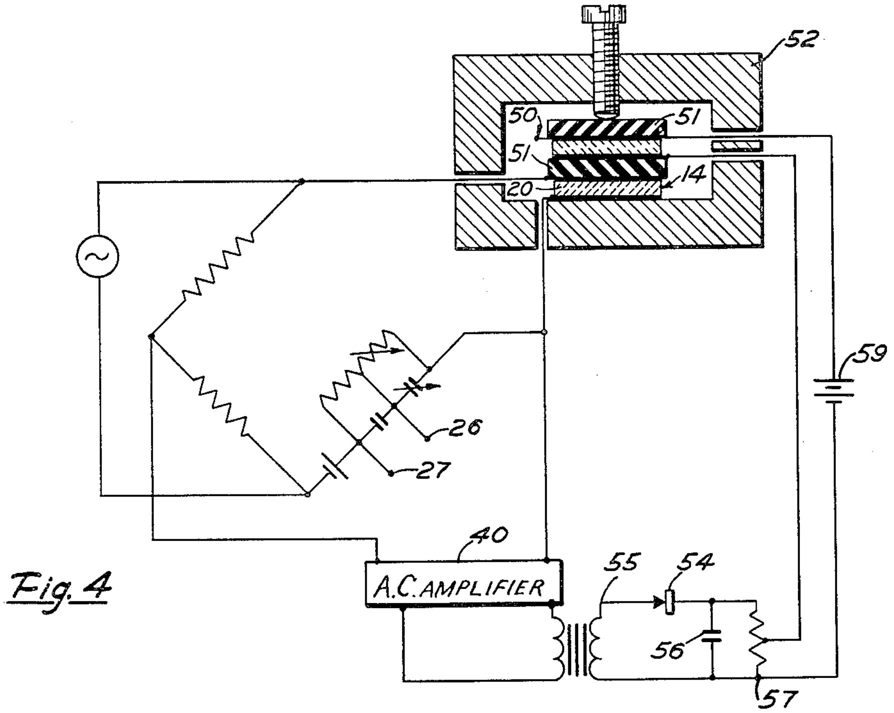
Figure 5:
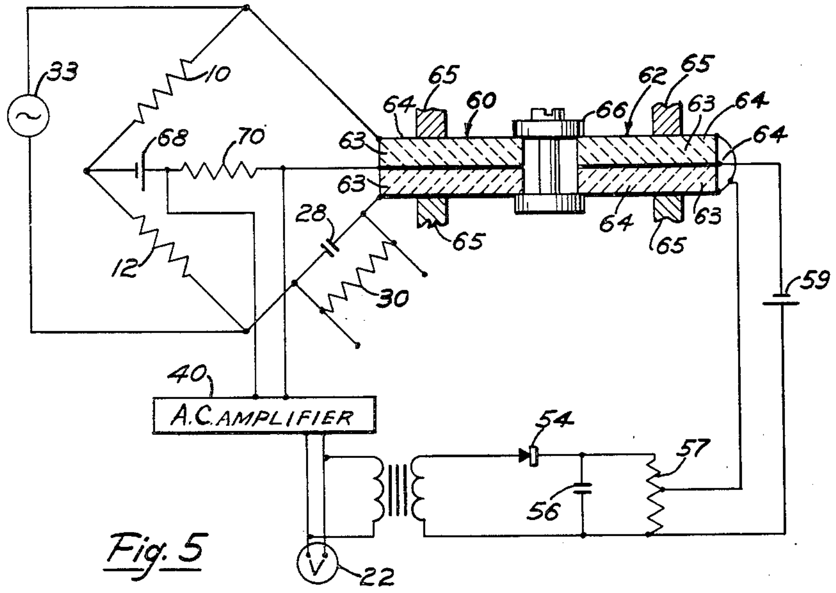

Fig. 4 illustrates an embodiment of the invention in which feedback increases the sensitivity of the amplifier by causing the piezoid to be stressed mechanically; and Fig. 5 illustrates a modification of the invention in which the single piezoid of Fig. 1 is replaced by a tandem crystal with a second tandem crystal adapted to translate feedback into a mechanical stress applied to the first tandem crystal.

The circuit shown in Fig. 1 comprises resistances 10 and 12 in series as one side of a bridge and a piezoid capacitor 14 in series with a variable capacitor 16 having a variable resistance shunt 17 as the other side of the bridge. The piezoid capacitor 14 consists of metal plates 18 separated by a substance 20, such as barium-strontium titanate, for example, exhibiting piezoelectric properties, which acts as the condenser dielectric. A low current drain voltmeter 22 connects the respective midpoints of the two sides of the bridge at point 23 and point 24. The input voltage is fed into the bridge at connections 26 and 27 across the capacitor 28. The capacitor 28 forces the input current to flow through the bridge; the resistance 30 shunts the capacitor to permit passage of a current to bias the piezoid where bias is desired. The bias voltage produced by a battery 32 assures more uniform operation of the amplifier. The A. C. supply current supplied by the generator 33 may be of low, medium or even high frequency.

In the operation of the form of invention thus far described, the capacitor 16 and resistor 17 are adjusted to balance the bridge at zero D. C. voltage input so no current flows through the voltmeter 22 when an alternating current source is connected to the bridge. A piezoelectric material such as Rochelle salt or barium-strontium titanate functions as a rather leaky dielectric so a piezoid capacitor acts to a certain extent as a resistance as well as a capacitor. The dielectric constant of piezoids varies greatly with field strength or mechanical stress. If a voltage is connected across the condenser 28, the bridge will become unbalanced due to the change in capacity of the piezoid capacitor 14 as the electric field changes the dielectric value of the piezoid. The extent to which the bridge is unbalanced can be determined by means of the voltmeter. The deviation of capacitance is measured and may be used to control an output which is proportional to the input voltage to be amplified or measured. Since the bridge is originally balanced at zero input voltage, the amplification for any voltage is the same independent of the polarity of the input voltage. The direction of current flow may be reversed with no indication of the reversal shown by the voltmeter. In order to avoid this disadvantage, a bias is inserted in the bridge circuit assuring that current will flow through the piezoid in one direction only. If the bridge is unbalanced at zero input voltage and a D. C. current is then applied, the bridge can approach the balance condition or will move away from it depending on the polarity of the input voltage in relation to the bias polarity. The bias also makes it possible to avoid fatigue and hysteresis phenomena which are sometimes present and cause erratic performance when the dielectric is operated at low loads.

The circuit shown in Fig. 1 may be supplemented by the feedback arrangement as represented in Fig. 2. A third capacitor 36 in parallel with a shunt 38 is placed in an arm of the bridge. An A. C. amplifier 40 connects the two bridge sides replacing the low drain vacuum tube voltmeter 22 of Fig. 1 which is connected to the A. C. amplifier output. The amplifier output is used to charge, via the transformer 42 and rectifier 43, the condenser 36 in proportion to the input voltage originally fed into the bridge. Feedback increases the sensitivity of the circuit by a considerable amount providing the input voltage has the same polarity as the feedback voltage.

The amplifier shown in Fig. 2 has the disadvantage that the feedback is positive only if the input voltage has the proper polarity. The circuit shown in Fig. 3 avoids this difficulty since the feedback will always have the same polarity as the input voltage. Bridge circuit elements appearing in Fig. 2 have the same operation when represented in Fig. 3. The feedback driving voltage is branched off the generator and is controlled by the phase sensitive means consisting of a ring modulator having a number of individual rectifiers 44, transformer coils 46, and resistors arranged in well known circuits. When the input polarity is reversed, the feedback voltage polarity will also be reversed so the feedback is maintained regenerative providing the correct relationship between feedback and input voltage is established at the outset.

Fig. 4 represents a piezoid amplifier with feedback in which the feedback modifies piezoid dielectric characteristics by means of a mechanical stress applied to the piezoid rather than by an electrical field. The piezoid 14 is located as in Figs. 1, 2, and 3 in a bridge circuit. It is combined with a second piezoid 50 in a suitable clamping device 52 in such a way that the mechanical force resulting when an electrical field is applied to the second piezoid 50 compresses the first piezoid 14. Insulation 51 separates the two piezoids. The feedback voltage is produced by the rectifier 54, transformer 55, and the filter unit containing a condenser 56 and resistance 57. A bias voltage derived from a source 59 assures that the second piezoid 50 has uniform operating characteristics. When the bridge circuit equilibrium is changed, due to an input voltage, the piezoid 14 will be expanded or contracted by means of the feedback voltage thus bringing the bridge, through the resulting capacitance variation of the piezoid dielectric 20, still further out of balance in the same direction as the original voltage.

An embodiment of the invention is shown in Fig. 5 in which the simple piezoids 14 and 50 of Fig. 4 are replaced by two tandem crystals 60 and 62. The term "tandem crystal" as used in the specification and claims of this case is intended to denote a crystal structure wherein a metallic electrode is connected to the opposing inner faces of two adjacent layers of piezoelectric material, and metallic electrodes are also connected to the outer faces of each of the piezoelectric layers. Each tandem crystal consists of two layers of piezoelectric material 63 bonded together with metal plates 64 between layers and on each outer side. The tandem crystals are mechanically coupled by a clamp 66 so that any deflection of the feedback tandem crystal will bend the tandem crystal in the bridge circuit. The outer ends of the tandem crystals are clamped in supports 65. The electrical axes of the layers are so arranged that an electrical field which will cause one layer to contract will at the same time cause the other layer to expand, thus resulting in a large bending force. One side of the bridge consists of resistances 10 and 12. The other side of the bridge is made up of two arms each including one half of the tandem crystal 60. Since capacitance and resistance characteristics of one part of the tandem crystal are the same as for the other part at zero input, it is not necessary to have an adjustable capacitor and adjustable resistance to balance the bridge. The input voltage is introduced across the condenser 28 shunted by resistance 30. In order to bias both parts of the bridge tandem crystal, the bias voltage source 68 is connected to the respective midpoints of the two sides of the bridge. The resistance 70 allows the bias to pass into the bridge circuit; at the same time an amplifier 40 may be connected across this resistance effective to amplify the supply current flowing in the bridge diagonal when the two sides of the bridge are unbalanced. The amplified current is rectified by the rectifier 54, filtered by the condenser 56 and resistance 57, and then fed into the feedback tandem crystal 62. The D. C. bias source 59 assures a suitable range of operation for the feedback tandem crystal.

In the operation of the bridge shown in Fig. 5, a low D. C. or A. C. input voltage disturbs the original equilibrium of the bridge by increasing the value of the dielectric constant of the substance in the other side of the tandem crystal. The corresponding increase and decrease in capacitance as the dielectric constant changes controls supply input to the amplifier 40. The rectifier output of the amplifier results in a bending of the feedback tandem crystal 62. The bending force is impressed upon the bridge tandem crystal 60 thus increasing the unbalance of the bridge circuit which leads to a positive feedback. Since the bridge tandem crystal is very sensitive to any mechanical disturbance and since the feedback tandem crystal 62 produces strong bending forces with relatively low voltages, the present piezoid amplifier has a high sensitivity without an abnormally high feedback. It also has good frequency response because the resonance frequency of the two coupled tandem crystals is very high.

It will be evident that the resistance 70 in Fig. 5 may be replaced by an inductor adapted to pass direct current and prevent the passage of alternating current of the supply frequency employed.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties therefor.

What is claimed is:

1. In a piezoelectric amplifier, an electrical bridge, a piezoid capacitor in one arm of the bridge circuit, an alternating current source connected across said bridge, a source of control voltage connected across said capacitor, a source of direct current connected effective to bias said piezoid capacitor, a second piezoid capacitor, clamping means effective to maintain said piezoid capacitor and said second capacitor in fixed juxtaposition, a source of direct voltage effective to bias said second piezoid capacitor, an alternating current amplifier connected across the diagonals of said bridge, means to rectify the output of said alternating current amplifier, and means to connect the rectified output to said second piezoid capacitor whereby the mechanical moment produced by feedback is applied directly to said piezoid capacitor.

2. In a piezoelectric amplifier, a bridge circuit having four arms, at least one of said arms including a piezoelectric dielectric capacitor, an alternating current source connected across said bridge circuit, means effective to connect an input voltage across all piezoelectric dielectric bridge arm capacitors, an alternating current amplifier connected to the bridge diagonals, means to rectify the output of said alternating current amplifier, a piezoelectric dielectric feedback capacitor mechanically coupled to each of said piezoelectric dielectric bridge arm capacitors, and means effective to impress said rectified amplifier output across said feedback capacitor.

3. In a piezoelectric amplifier, a first tandem crystal, an electrical bridge having four arms, at least one of said arms including one half of said first tandem crystal, an adjacent arm including the other half of said first tandem crystal, two impedances in series forming the other side of said bridge, a source of alternating current connected across said bridge, means to connect a direct bias voltage source to said first tandem crystal, a source of control voltage connected across said first tandem crystal, means effective to connect the respective midpoints of the sides of said bridge whereby an alternating current voltage proportional to the input voltage may be obtained, an alternating current amplifier connected to the respective midpoints of the sides of said bridge, means to rectify the output of said alternating current amplifier, a second tandem crystal, clamping means effective to rigidly couple said first tandem crystal to said second tandem crystal, means to connect a direct voltage bias source to said second tandem crystal, and means for impressing said rectified output across said second tandem crystal.

References Cited in the file of this patent

UNITED STATES PATENTS

| | | |
|---|---|---|
| 2,075,526 | Koch | Mar. 30, 1937 |
| 2,191,315 | Guanella | Feb. 20, 1940 |
| 2,470,893 | Hepp | May 24, 1949 |
| 2,594,841 | Arndt | Apr. 29, 1952 |
| 2,641,741 | Peterson | June 9, 1953 |

FOREIGN PATENTS

| | | |
|---|---|---|
| 262,680 | Switzerland | Oct. 17, 1949 |
| 944,142 | France | Oct. 25, 1948 |